ପ୍ରtent2,951,830
Patented Sept. 6, 1960

2,951,830
FUNGUS-RESISTANT ELASTOMER

Benjamin D. Halpern, Jenkintown, and Wolf Karo, Elkins Park, Pa., assignors to The Borden Company, New York, N.Y., a corporation of New Jersey No Drawing. Filed Apr. 8, 1958, Ser. No. 727,069

2 Claims. (Cl. 260—79.5)

This invention relates to a new fungus-resistant elastomer. In particular it relates to such an elastomer which is also resistant to long contact with solvents and fuels up to temperatures of about 175° C.

Previously described elastomers, such as natural rubber, the rubbery copolymers of butadiene, and the rubbery homopolymers of isoprene and chloroprene, are deficient in resistance to heat, particularly to hot solvents and fuel. Further, such elastomers are attacked by fungi. As a consequence of these deficiencies, it has been extremely difficult to use elastomeric products for certain purposes in medicine and surgery. Thus, heat or steam sterilization, satisfactory for metal instruments, causes distortion of rubber gloves if carried out under time-temperature conditions sufficient to kill fungi. Time-consuming scrubbing with fungicidal solutions is often a necessary step in such sterilization.

One object of this invention is to provide an elastomeric material which is fungus-resistant, heat-resistant, and water-, solvent-, and fuel-resistant, and can be fashioned into shaped products in a manner similar to the common elastomers. A further object of this invention is to provide a material from which can be made fungus-resistant elastomeric products which can be heated for long periods in air or in presence of water or solvents at a temperature of about 175° C. without distortion or loss of elastomeric properties.

The elastomeric material of this invention consists of the copolymer of 75 to 98 parts by weight of the trifluoroethyl ester of acrylic acid and 2 to 25 parts of N-1,1-dihydroheptafluorobutylacrylamide. The polymerization may be done in bulk, emulsion or aqueous suspension but especially readily in aqueous suspension wherein 0.001 to 1.000% by weight with reference to the monomers of an organic peroxide is used as the catalyst and the suspending agent consists of an organic, water-binding material such as starch, polyvinyl alcohol or polyacrylate salts. The copolymers of this invention can be compounded with other ingredients such as fillers and plasticizers on ordinary rubber processing equipment and are vulcanizable in the presence of sulfur and an amine base.

Trifluoroethyl acrylate is prepared by reacting trifluoroethanol (B.P. 74.05° C., $d_{22°}$ 1.3739 gm./ml.) with acrylyl chloride in the presence of triethylamine. Trifluoroethyl acrylate has a boiling point of 91–92° C. and index of refraction ($n_d^{25}$) of 1.3475.

N-1,1-dihydroheptafluorobutyl acrylamide is prepared by reacting N-1,1-dihydroheptafluorobutylamine with acrylyl chloride. Preparation of the amine is described in U.S. Patent 2,691,043. Reaction of the amine with acrylyl chloride to form the acrylamide is preferably done in anhydrous solution in the presence of triethylamine. (See co-pending application of Halpern, Karo and Levine, Serial No. 478,182, filed December 28, 1954.) N-1,1-dihydroheptofluorobutyl acrylamide is a solid melting at 57.4 to 57.6° C.

As a specific embodiment of this invention 3.9 grams of N-1,1-dihydroheptafluorobutylacrylamide and 0.025 gm. of benzoyl peroxide were dissolved in 21.1 gms. of trifluoroethyl acrylate. The mixture was then added to 250 ml. of a solution of 0.15% aqueous polyvinyl alcohol, maintained at 80° C. and constantly stirred. After three hours of agitated reaction at 80° C. the residual monomer was removed by steam distillation to yield a product which was filtered and washed with hot water. The yield was 18 gms.

The product was compounded on a rubber mill with 35% by weight of high-abrasion carbon black, 1% of sulfur, 1% paraffin and 0.75 part of triethylamine, sheeted out and cured at 320° F. for 30 minutes. The cured product was flexible and rubbery and withstood 100 hours in Esso Turbo oil at 175° C. without any appreciable change in shape or physical properties.

The products of this invention when tested for fungus resistance by United States Armed Forces Specification MIL-F-8261 Procedure 3.9.2 and Method 4.5 show no fungus growth after a 14 day exposure to fungi.

We claim:
1. A copolymer of 75 to 98 parts by weight of the trifluoroethyl ester of acrylic acid and 2 to 25 parts by weight of N-1,1-dihydroheptafluorobutyl acrylamide.

2. A sulfur and triethylamine vulcanized copolymer of 75 to 98 parts by weight of the trifluoroethyl ester of acrylic acid and 2 to 25 parts by weight of N-1,1-dihydroheptafluorobutyl acrylamide.

References Cited in the file of this patent

UNITED STATES PATENTS

| | | |
|---|---|---|
| 2,743,297 | Husted et al. | Apr. 24, 1956 |
| 2,834,763 | Halpern et al. | May 13, 1958 |